United States Patent [19]

Cadwell

[11] 4,389,058
[45] Jun. 21, 1983

[54] HITCH ASSEMBLY

[76] Inventor: Vyrl E. Cadwell, Rte. 2, Box 50, Manilla, Iowa 51454

[21] Appl. No.: 254,404

[22] Filed: Apr. 15, 1981

[51] Int. Cl.³ ............................................. B60D 1/10
[52] U.S. Cl. .............................. 280/415 A; 172/248; 280/479 R; 280/515
[58] Field of Search .......... 280/415 A, 415 R, 479 R, 280/478 R, 478 B, 504, 515; 172/248, 677, 678, 679, 680

[56] References Cited

U.S. PATENT DOCUMENTS

| 3,046,037 | 7/1962  | Cain       | 280/515   |
| 3,715,133 | 2/1973  | Schafer    | 280/479 A |
| 3,738,683 | 6/1973  | Tate       | 280/478 R |
| 3,774,943 | 11/1973 | Schmiesing | 280/479 R |
| 4,015,855 | 4/1977  | Murray     | 280/479 R |
| 4,343,484 | 8/1982  | Van Antwerp| 280/479 A |

Primary Examiner—Joseph F. Peters, Jr.
Assistant Examiner—Donn McGiehan
Attorney, Agent, or Firm—Zarley, McKee, Thomte, Voorhees & Sease

[57] ABSTRACT

The hitch assembly of the present invention comprises a hitch frame which is adapted to be mounted to the three point lift of a conventional tractor. The hitch assembly includes a draw bar mounted to the hitch frame, and a hydraulically operated pin mounted above the draw bar. The pin is hydraulically movable downward into the pin receiving hole in the draw bar, and is also hydraulically movable upwardly into spaced relation above the draw bar. A coil spring interconnects the hydraulic cylinder and the pin, and this coil is sufficiently flexible to permit the pin to deflect laterally in response to encountering immovable objects during its reciprocating movement. A cable interconnects the pin and the hydraulic cylinder through the center of the coil so as to prevent the coil from becoming stretched beyond a predetermined point. An overrun mechanism is provided on the hitch frame, and engages the fixed draw bar of the tractor so as to limit upward movement of the hitch frame with respect to the tractor. A modified form of the invention is adapted to be fixed to the draw bar of the tractor, and includes a grasping assembly for grasping the tongue of the vehicle to be towed, and lifting the tongue so that the clevis at the end of the tongue can be positioned in registered alignment with the draw bar of the tractor.

13 Claims, 15 Drawing Figures

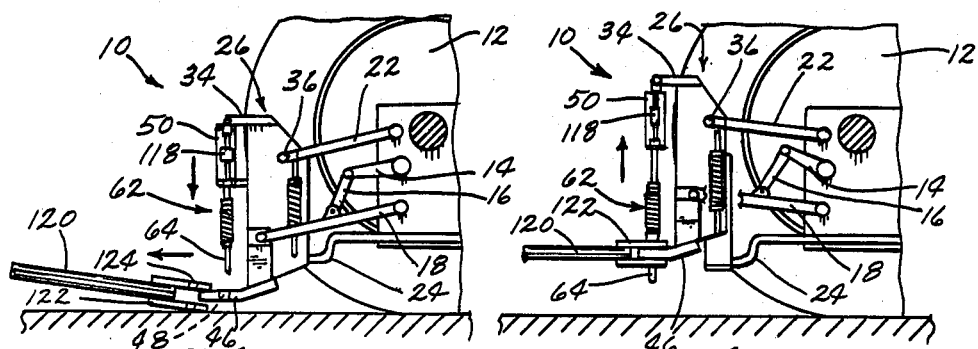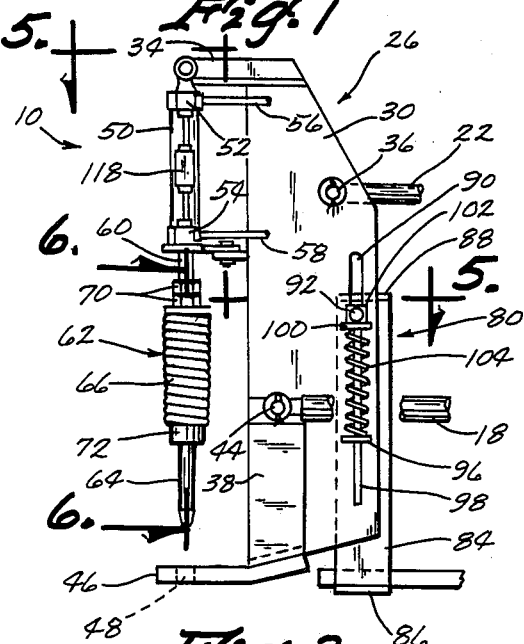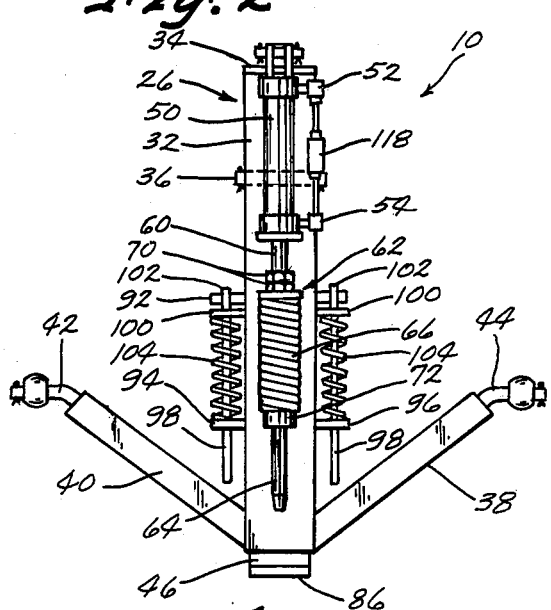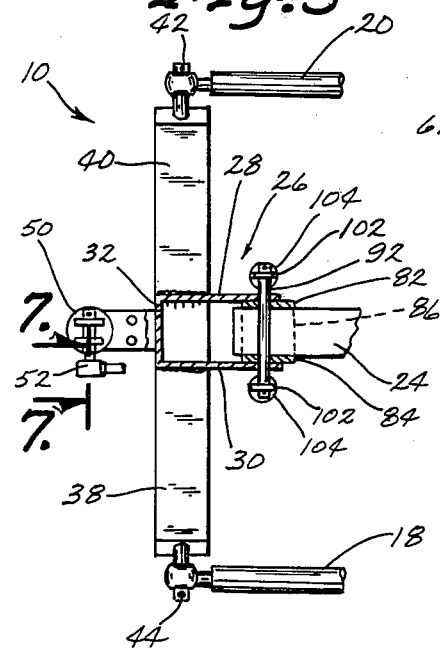

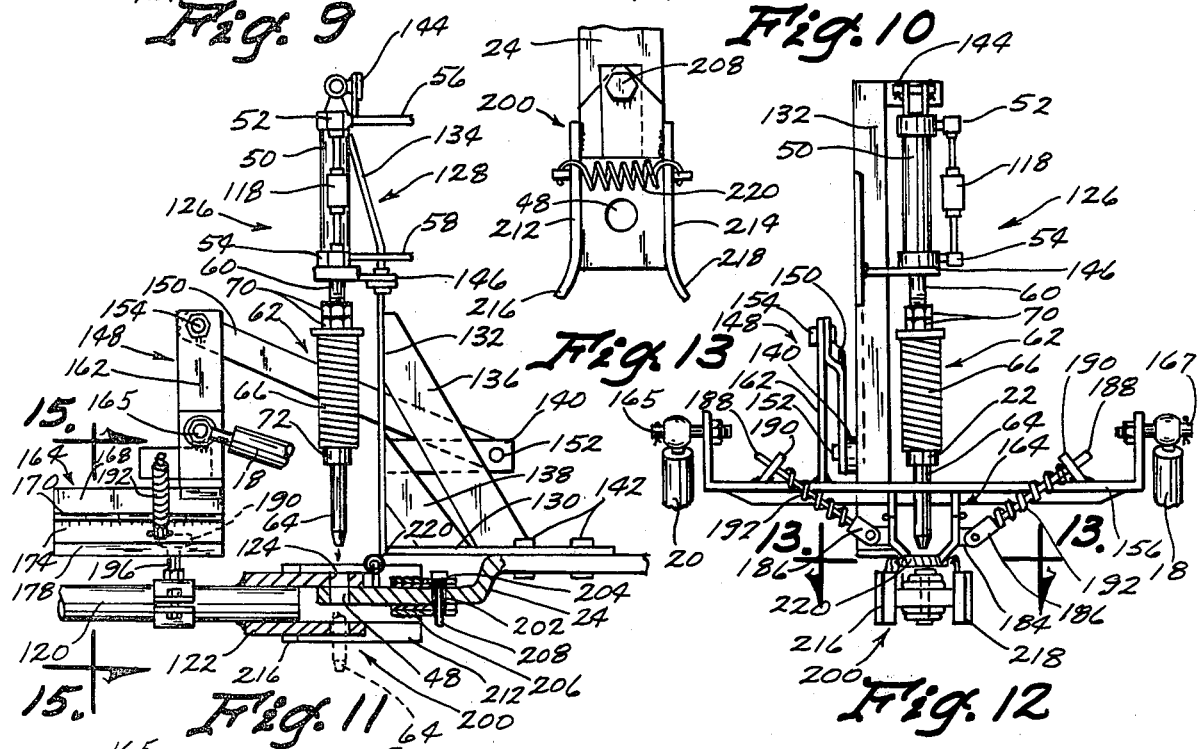

HITCH ASSEMBLY

BACKGROUND OF THE INVENTION

The present invention relates to a hitch assembly for use with agricultural tractors.

Tractors are often used in agriculture for towing various vehicles, and it is often necessary to hitch and unhitch the tractor from the tongues of these vehicles. Normally, the tongue of the vehicle to be towed includes a clevis having a vertically oriented pin receiving hole therein. The clevis is adapted to embrace a draw bar fixed to the tractor and having a vertically oriented pin receiving hole therein. When the vertical hole of the clevis is aligned with the vertical hole of the draw bar, a pin is inserted to lock the two together. Normally, this is a manual operation, and requires the tractor operator to dismount from the tractor, to position the clevis of the vehicle to be towed in the proper position with respect to the draw bar, and to insert the pin into the aligned holes thereof.

Coupling and disconnecting a towed vehicle to a tractor is often a difficult task to accomplish with one person. If the towed vehicle is very heavy, the tractor operator often encounters time consuming difficulty in properly positioning the tractor with respect to the towed vehicle so that the pin can be safely inserted or removed.

These problems can be overcome by an automatically operable hitching means which permits the operator to either couple or disconnect the towed vehicle without dismounting from the tractor.

Therefore, a primary object of the present invention is the provision of an improved means for permitting a tractor operator to couple or disconnect a towed vehicle without having to dismount from the tractor, thus saving fuel and labor while improving operator safety.

A further object of the present invention is the provision of an automatic hitching assembly which includes a pin mounted by a flexible coupling which permits the pin to deflect laterally in response to encountering various objects during its downward movement.

A further object of the pesent invention is the provision of an improved hitch assembly which includes a flexible coupling, and which further includes a limiting means to prevent the stretching of the flexible coupling during removal of the pin when unhitching the towed vehicle.

A further object of the present invention is the provision of an improved hitching means which is hydraulically operated and which is readily adaptable for use with the hydraulic system of a conventional tractor.

A further object of the present invention is the provision of an improved hitching assembly which includes a hydraulic cylinder and hydraulic restricting means for protecting the cylinder from higher hydraulic pressures received from the hydraulic system of the tractor.

A further object of the present invention is the provision of an improved hitching apparatus which includes tongue grasping means for grasping the tongue of the towed vehicle and lifting the tongue into a position aligned with the draw bar of the tractor.

A further object of the present invention is the provision of an improved hitching apparatus which includes grasping means capable of moving the clevis of the tongue of the towed vehicle into a position wherein the pin receiving holes of the clevis are in registered alignment with the pin receiving hole of the tractor draw bar.

A further object of the present invention is the provision of a hitching apparatus having a tongue grasping means capable of moving the tongue into the proper position with respect to the draw bar, and further capable of releasing its grasping engagement of the tongue after the vehicle to be towed has been coupled to the draw bar.

A further object of the present invention is the provision of a modified form of hitching assembly wherein the hitching assembly may be mounted directly to the draw bar of the vehicle.

A further object of the present invention is the provision of a hitching assembly which utilizes the three point lift of the tractor during its operation.

A further object of the present invention is the provision of a device which is economical to manufacture, durable in use and efficient in operation.

SUMMARY OF THE INVENTION

The present invention utilizes a hitch assembly which is adapted to be mounted to the three point lift of the tractor. The three point lift lowers the hitch so that the draw bar of the hitch can engage the clevis of the tongue of the vehicle to be towed. The hitch draw bar is then lifted upwardly so that the tongue of the vehicle to be towed is in a horizontal position. The tractor is then backed rearwardly until the holes of the clevis and the draw bar are aligned.

The hitch then utilizes a hydraulically actuated pin which is forced downwardly into the aligned pin receiving holes of the clevis and the hitch draw bar.

The rod of the hydraulic cylinder is connected to the locking pin by means of a coiled spring which provides a flexible coupling therebetween. If the pin encounters resistance as it is being forced downwardly by the hydraulic cylinder, the spring is flexible so as to deflect and prevent damage to the pin or other portions of the hitch. Furthermore, the coil permits the pin to deflect laterally to compensate for slight misalignment of the apertures in the tongue clevis and the draw bar.

A cable interconnects the rod of the hydraulic cylinder and the pin. The cable runs through the center of the coil spring and limits the distance between the pin and the rod of the cylinder. This protects the coil from being stretched beyond a predetermined length during removal of the pin from the apertures.

An overrun mechanism is provided on the hitch assembly. It includes a channel member which is vertically slidable with respect to the frame of the hitch assembly. The channel member includes a U-shaped frame which engages the under-surface of the permanent tow bar of the tractor. Spring means interconnect the channel and the hitch frame so as to yieldably resist any movement of the hitch frame upwardly with respect to the channel. This prevents the tongue of the vehicle being towed from moving upwardly with respect to the tractor as might be the case in a downhill towing situation.

A modified form of the invention contemplates the mounting of the hitch assembly directly to the permanent draw bar of the tractor. The hitch assembly is rigidly secured to this draw bar, and the pin of the hitch assembly is positioned in such a manner as to be vertically aligned with the pin receiving hole of the tractor draw bar.

A tongue grasping means is provided for lifting the tongue of the vehicle to be towed so that the clevis may be aligned with the aperture in the tractor draw bar. The lifting apparatus includes a grasping channel which is adapted to slidably engage a large button on a lug which is permanently fixed to the tongue of the vehicle to be towed. The grasping means is pivotally mounted to the hitch frame and is raised and lowered by the three point lift assembly of the tractor. In operation, it is lowered and slidably engaged with the button on the tongue of the vehicle to be towed. The hydraulic lift of the tractor is then raised so as to lift up the tongue of the vehicle to be towed until it is in horizontal alignment with the draw bar of the tractor. The tractor is then backed rearwardly with the button attached to the vehicle to be towed sliding longitudinally within the grasping means. When the clevis of the tongue is in registered alignment with the aperture of the draw bar, the pin is hydraulically lowered into the aligned clevis and draw bar holes.

The tongue grasping means is adapted to yieldably release its grip on the button mounted to the towed vehicle's tongue. This release is accomplished by raising the hydraulic lift of the tractor after the clevis of the towed vehicle has been attached to the draw bar. The grasping means releases its grip of the button on the tongue in response to this upward pressure.

While hydraulic means are shown for moving the pin in an upward and downward direction, it is also possible to use other means such as solenoids or other devices which would cause the pin to move upwardly and downwardly once the tongue clevis is aligned with the draw bar.

BRIEF DESCRIPTION OF THE DRAWINGS

FIG. 1 is a side elevational view of the lifting device showing the device in its lowered position.

FIG. 2 is a view similar to FIG. 1 showing the device in its lifted position.

FIG. 3 is an enlarged side elevational view of the hitch assembly shown in FIGS. 1 and 2.

FIG. 4 is a rear elevational view of the device shown in FIG. 3.

FIGS. 5, and 6 are sectional views taken along lines 5—5 and 6—6 of FIG. 3.

FIG. 7 is a sectional view taken along line 7—7 of FIG. 5.

FIG. 8 is a sectional view similar to FIG. 7, but showing the flow restrictor valve in a different position.

FIG. 9 is a side elevational view of a modified form of the invention showing the tongue grasping means in a lowered position.

FIG. 10 is a view similar to FIG. 9, but showing the tongue grasping means in an elevated position.

FIG. 11 is an enlarged side view of the device shown in FIGS. 9 and 10.

FIG. 12 is a rear view of the device shown in FIG. 11.

FIG. 13 is a sectional view taken along line 13—13 of FIG. 12.

FIG. 14 is a top plan view of the device shown in FIG. 12.

FIG. 15 is a sectional view taken along line 15—15 of FIG. 11.

DETAILED DESCRIPTION OF THE INVENTION

Referring to the drawings, the numeral 10 generally designates a hitch assembly of the present invention. Assembly 10 is shown mounted to a tractor 12, having a three point lift comprising a lift linkage 14, 16, a pair of lift arms 18, 20 (FIG. 5) and an upper lift link 22. Tractor 12 also includes a permanent tractor draw bar 24.

Hitch assembly 10 includes a hitch frame 26 comprising a pair of vertically upstanding and spaced apart hitch frame members 28, 30 interconnected by a hitch web 32 so as to form a U-shaped configuration in cross-section. At the upper end of hitch frame 26 is rigidly mounted a cylinder mounting ear 34.

Adjacent the upper ends of hitch frame members 28, 30 are a pair of holes adapted to receive a locking pin 36 for coupling upper lift link 22 of the tractor three point lift to hitch frame 26. Extending laterally outwardly from the lower end of hitch frame 26 are a pair of wing frame members 38, 40 which include coupling pins 42, 44 at their outer ends which are coupled in conventional fashion to the rearward ends of lift arms 18, 20 of the three point lift of the tractor. Thus, hitch frame 26 is coupled to the three point lift of the tractor and is movable upwardly and downwardly in response to actuation of the tractor hydraulic lift.

Welded or otherwise secured to the lower end of hitch frame 26 is a hitch draw bar 46 having a vertically oriented pin receiving hole 48 therein.

Mounted to the upper end of cylinder mounting ear 34 is a hydraulic cylinder 50 having upper and lower hydraulic couplings 52, 54 which are adapted to be connected to the hydraulic hoses 56, 58 from the tractor hydraulic system. Cylinder 50 includes a cylinder rod 60 which is adapted to extend and retract in response to actuation of cylinder 50. Mounted to rod 60 is a pin assembly 62 comprising a locking pin 64, and a coil spring 66. Coil spring 66 includes a cap 68 at its upper end. Rod 60 is threadably received within cap 68 and is held securely therein by locking nuts 70. A lower cap 72 is secured to the lower end of spring 66 and includes a pin receptacle hole 74 for receiving pin 64. A locking bolt 76 holds pin 64 securely within hole 74. A cable 78 is attached at its upper end to upper cap 68 and is attached at its lower end to lower cap 72. Cable 78 extends through the coil of spring 66, and provides a limit means for limiting the amount of stretching which can occur in coil 66. Thus when pin 64 is withdrawn from a pin receiving hole, cable 78 prevents coil 66 from stretching whenever pin 64 becomes stuck and is difficult to remove from the hitch draw bar.

Pin 64 is in vertical registered alignment with pin receiving hole 48 so that upon actuation of cylinder 50 pin 64 moves downwardly within hole 48 as shown in FIG. 2. Actuation of cylinder 50 to lift rod 60 causes pin 64 to be lifted upwardly out of hole 48 to the position shown in FIG. 3.

Slidably mounted within the space between hitch frame members 28, 30 is a slide frame 80 which includes a pair of spaced apart side frame members 82, 84 which are joined at their bottom ends by a web plate 86 and which are joined at their upper ends by an upper web plate 88.

Formed in each hitch frame member 28, 30 is a vertically extending slot 90 which is adapted to receive a slide pin 92 which extends transversely through slide frame 80 and protrudes within slot 90 so as to provide guidance of slide frame 80 in a vertical upward and downward path.

Mounted on the outside surfaces of hitch frame members 28, 30 are a pair of spring mounting ears 94, 96. Each ear 94, 96 includes a vertical opening therethrough which slidably receives a spring pin 98. The upper ends of spring pins 98 each include a cap 100 having a vertical flange 102 thereon with a horizontal opening therein which slidably receives the opposite end of pin 92. Compressed between cap 100 and spring mounting ear 94 is a spring 104 which surrounds pin 98 and which is adapted to be compressed in response to downward movement of slide pin 92.

The purpose of slide frame 80 is to provide a limit to the upward movement of hitch assembly 26 with respect to tractor 12. For example, when tractor 12 is pulling a wagon down a slope, there is a tendency for the tongue of the wagon to be forced upwardly. Since many hydraulic lifts of tractors do not resist this upward movement, there is a need to limit the upward movement of the hitch assembly with respect to the tractor. Slide frame 80 provides this function because web plate 86 fits under the bottom surface of permanent tractor draw bar 24. Thus, when hitch frame 26 is forced upwardly by a wagon tongue, this upward movement is resisted by virtue of the compression of spring 104.

Hydraulic couplings 52, 54 are provided with a special restrictor valve which limits the rate of hydraulic flow into the cylinder beyond a predetermined rate of flow. Referring to FIGS. 7 and 8, each coupling 52, 54 includes a valve chamber 106 therein which receives a restrictor valve member 108. Extending centrally through valve member 108 is a central orifice 110 which is substantially smaller than the inlet orifice 112 into cylinder 50. Around the outer edge of valve member 108 are a plurality of tapered grooves 114 which taper radially outwardly as they progress toward cylinder 50. At their upper ends grooves 114 include a small opening 116 which is positioned slightly radially inwardly from the outer radial edge of valve member 108.

When pressure is introduced from hose 56 into cylinder 50 in the manner shown in FIG. 7, valve member 108 moves to the left within valve chamber 106. It should be noted that valve chamber 106 has a slightly longer axial length than valve member 108. The pressure from the hydraulic fluid entering through hose 56 forces valve member 108 into facing engagement with the left end of chamber 106 so that fluid can enter inlet orifice 112 only through central orifice 110 of valve member 108. Thus, the amount of fluid permitted to enter cylinder 50 is limited by the size of central orifice 110.

Referring to FIG. 8, however, the reverse flow of fluid is shown. In this situation, fluid is exiting from cylinder 50 and this reverse pressure causes valve member 108 to be moved to the right within chamber 106. In this position, fluid is permitted to exit through central orifice 110 and also is permitted to pass around the small openings 116 at the outer peripheral edge of each groove 114. This insures that fluid can exit cylinder 50 at a greater rate than it enters cylinder 50, so as to provide efficient operation thereof.

A bypass valve 118 is also used in the hydraulic circuit so as to lower the pressure to the cylinder from the tractor. This will limit the force that can be applied to the draw bar pin and prevent damaging the pin or the implement hitch. This bypass release valve may be built into the cylinder piston or connected between the hydraulic lines as shown in the drawings.

In operation, the tractor is backed toward the tongue 120 of a vehicle which is desired to be towed. Tongue 120 includes a conventional clevis 122 having a pin receiving hole 124 therein. The hydraulic three point lift of the tractor is lowered, thereby lowering hitch frame 26 to the position shown in FIG. 1. When hitch draw bar 46 is lowered to the level of clevis 124, the tractor is backed further rearwardly until the pin receiving hole 48 of draw bar 46 is aligned with the pin receiving hole 124 of clevis 122. The hydraulic lift of the tractor is then raised until tongue 120 is in an approximate horizontal position. At this point, it may be necessary to further move the tractor forward and rearwardly until the apertures 124, 48 are properly aligned. Then cylinder 50 is actuated and pin 64 is lowered into the aligned apertures 124, 48 as shown in FIG. 2. Should resistance be encountered to the downward movement of pin 64, this resistance will be absorbed by spring 66. Spring 66 will permit the pin to move laterally in order to compensate for slight misalignment of holes 48, 124. If a sufficiently great resistance is encountered, spring 66 will bend and deflect from its axial direction, thereby protecting pin 64 from damage. Furthermore, should a sufficiently large resistance be encountered bypass valve 118 will come into operation and will bypass the hydraulic fluid so as to prevent damage to the device.

Spring 62 also provides a superior flexibility after the clevis 122 has been coupled to draw bar 46. During movement of the tractor uphill and down hill and during turning of the tractor, it is desirable that pin 64 can have certain limited movement, and the flexibility of spring 66 permits this limited movement.

Whenever tractor 12 pulls an implement downhill, there is a tendency for the tongue 120 of the implement to ride upwardly. However, the slide frame 80 prevents this upward movement by virtue of its engagement with permanent drawbar 24 of the tractor, and further by virtue of springs 104.

FIGS. 9-15 show a modified form of the invention designated generally by the numeral 126. Hitch assembly 126 utilizes the same pin assembly 62 as shown in FIGS. 1-8, and accordingly, the same reference numerals are utilized to indicate corresponding parts.

However, a different form of hitch frame 128 is utilized. Frame 128 is L-shaped in configuration and includes a lower horizontal leg member 130 and a vertical leg member 132. The upper end of vertical leg member 132 includes an angled extension 134. A pair of angular gusset members 136, 138 are attached to leg members 130, 132 to provide reinforcement thereto. A horizontal frame member 140 is attached by welding or other means to vertical leg 132 and gusset 136 in horizontal spaced relation above leg member 130.

Leg member 130 includes a pair of openings therein for receiving bolts 142 which extend through these apertures and into corresponding openings within the permanent tractor draw bar 24, as shown in FIG. 11. These bolts 142 attach the hitch frame 128 to the tractor draw bar 24 for fixed securement thereto. An upper bracket 144 and a lower bracket 146 are carried by the upper end of vertical leg member 132 and are adapted to be secured to hydraulic cylinder 50 as shown in FIGS. 11 and 12.

The position of pin assembly 62 is such that pin 64 is in registered alignment with the pin receiving hole 48 of tractor draw bar 24. Thus, when hydraulic cylinder 50 is actuated, pin 64 moves downwardly into pin receiving hole 48 as shown in shadow lines in FIG. 11.

Because hitch frame 128 is fixed to tractor draw bar 24, it is necessary to provide means for grasping and lifting the tongue 120 of the vehicle to be pulled.

This lifting function is provided by a lifting and grasping mechanism generally designated by the numeral 148. A connecting link 150 is pivotally mounted at one of its ends to horizontal frame member 140 for pivotal movement about axis 152 and is pivotally mounted at its other end to lifting and grasping mechanism 148 for pivotal movement about axis 154. Mechanism 148 comprises a horizontal bar 156 having a pair of upstanding frame members 158, 160 at its opposite ends. Intermediate its opposite ends is a third upstanding member 162, the upper end of which provides the pivotal connection 154 between link 150 and mechanism 148. Upstanding frame members 158, 160 include a pair of coupling pins 165, 167 which are used in conventional fashion for coupling to lift arms 18, 20 of the three point lift of the tractor 12. Thus, lift arms 18, 20 raise and lower mechanism 148 about the pivotal axis 152, 154 at the opposite ends of link 150.

Depending downwardly from the under surface of horizontal bar 156, is a pick-up chute assembly 164 comprising a pair of downwardly extending flanges 166, 168 which are fixed at their upper ends to bar 156, by welding or other conventional means. The lower edges of flanges 166, 168 are provided with hinges 170 which provide a hinged horizontal axis for the pivotal connection between flanges 166, 168 and wing flanges 172, 174. Wing flanges 172, 174 include inwardly extending lips 176, 178 at their lower ends. Because of the pivotal axis provided by hinges 170, wing flanges 172, 174 can pivot from the position shown in FIG. 15 outwardly away from one another. Flanges 172, 174 are held in the position shown in FIG. 15 by means of spring assemblies 180, 182. Each flange 176, 178 includes an ear 184 on its outer surface which is adapted to be connected to a small clevis 186 of spring assemblies 180, 182. Clevis 186 is attached to a pin 188 which is slidably inserted through an ear 190 on horizontal bar 156 (FIG. 12). A coil spring 192 is compressed between ear 190 and clevis 186 so as to urge wing flanges 172, 174 to their innermost position shown in FIG. 15. However, flanges 172, 174 will yieldably separate against the bias provided by springs 192.

Mounted on the tongue 120 of the vehicle to be pulled, is a lug assembly 194 having an upstanding shaft 196 with a button 198 on its upper end. The width of button 198 is greater than the distance between lips 176, 178 when flanges 172, 174 are in their position shown in FIG. 15. However, the thickness of shaft 196 is less than the distance between lips 176, 178. For this reason, button 198 is free to slide longitudinally along the lengths of flanges 172, 174, but it does not normally pull downwardly out of retentive engagement with lips 176, 178.

Referring to FIG. 13, a draw bar guide member 200 may be utilized. Member 200 comprises a pair of clevis plates 204, 206 (see FIG. 11) are welded to a pair of spring plates 212, 214 so as to form a clevis. Plates 204, 206 include registered openings for receiving a bolt or pin 208 which extends through a secondary hole 202 of tractor draw bar 24. Spring plates 212, 214 extend rearwardly from their connection to plates 204, 206 and terminate in outwardly diverging ends 216, 218. A coil spring 220 yieldably urges spring plates 214, 216 toward one another. The purpose of spring plates 214, 216 is to guide the clevis 122 of tongue 120 into registered alignment with pin receiving hole 48 of draw bar 24. In operation, tractor 12 is backed toward tongue 120 which is resting on the ground as shown in FIG. 9. The hydraulic lift of the tractor is lowered so as to lower grasping means 148 into a position wherein the longitudinal channel provided by wings 172, 174 and lips 176, 178 is in registered alignment with the button 198 on tongue 120. Once button 198 is positioned between lips 176, 178, the hydraulic lift is lifted so that grasping means moves from the position shown in FIG. 9 to the position shown in FIG. 10, thereby aligning clevis 122 of tongue 120 in horizontal alignment with hole 48 of draw bar 24. Once this horizontal alignment is accomplished, the tractor is again backed a few inches so that clevis 122 moves into a position with its pin receiving holes in registered alignment with hole 48 of draw bar 24, all as shown in FIG. 11. Hydraulic cylinder 50 is then actuated to lower pin 64 through the pin receiving holes in clevis 122 and the pin receiving hole 48 in draw bar 24. Once pin 64 is in place, the hydraulic lift of the tractor is raised further, thereby causing lips 176, 178 to spread apart against the bias of springs 192 and lift upwardly out of retentive engagement with button 198.

It is possible to utilize lifting and grasping mechanism 148 with either the modifications shown in FIGS. 9-15 or the modifications shown in FIGS. 1-8.

It can be seen that the present invention permits the operator to attach the tongue of a wagon to be towed to the tractor without having to dismount from the tractor. The device is simple to use, economical to manufacture, and durable in use. Thus, it can be seen that the device accomplishes at least all of its stated objectives.

What is claimed is:

1. A hitch assembly for a tractor having a three point lift comprising a pair of spaced apart lift arms and an upper lift link, said tractor further having a tractor draw bar attached thereto and extending rearwardly therefrom, said hitch assembly comprising:

a hitch frame;
   a hitch draw bar connected to said frame and having a vertically disposed pin receiving hole therein;
   a vertically extendible power means connected to said frame above said pin receiving hole, said power means having an extensible member movable upon actuation of said power means from a retracted elevated position to an extended lowered position;
   a pin assembly connected to said extensible member and including an elongated vertically disposed coil spring and a locking pin, said coil spring having an upper end connected to said extensible member and a lower end connected to said pin and yieldably holding said pin in vertical registered alignment with said pin receiving hole;
   said pin normally being fitted within said receiving hole when said power means is in said extended position and being spaced upwardly therefrom when said power means is in said retracted position; and
   said coil spring being yieldably flexible intermediate its said upper and lower ends whereby said coil spring will yieldably deflect in any direction when said pin encounters a resistance of predetermined magnitude during downward movement of said extensible member of said power means.

2. A hitch assembly according to claim 1 wherein limit means interconnect said pin and said extensible member to limit the distance between said pin and said extensible member during movement of said extensible member from said extended to said retracted position, thereby protecting said coil spring from stretching beyond a predetermined length in response to tension thereon.

3. A hitch assembly according to claim 2 wherein said said limit means comprises a cable connected at one of its ends to said pin and connected at the other of its ends to said extensible member of said power means.

4. A hitch assembly according to claim 1 wherein three point coupling means are connected to said frame for permitting said frame to be coupled to said lift arms and upper lift link of said three point lift.

5. A hitch assembly according to claim 1 wherein overrun limiting means are carried by said frame for engaging the undersurface of said tractor draw bar to limit upward movement of said frame with respect to said tractor drawbar.

6. A hitch assembly according to claim 5 wherein said overrun limiting means comprises a slide member movably mounted to said frame for vertical movement therewith, spring means between said frame and said slide member for yieldably holding said frame in a predetermined position with respect to said slide member, said frame being yieldably movable upwardly from said predetermined position against the bias of said spring, said slide member having a horizontal flange engaging said undersurface of said tractor drawbar.

7. A hitch assembly according to claim 1 wherein said power means comprises a hydraulic cylinder having first and second hydraulic couplings at the opposite ends thereof, said first and second couplings each having a flow restrictor means connected thereto, said flow restrictor means being adapted to limit the rate of hydraulic flow into said cylinder beyond a predetermined rate of flow.

8. A hitch assembly for a tractor having a three point lift comprising a pair of spaced apart lift arms and an upper lift link, said tractor further having a tractor draw bar attached thereto and extending rearwardly therefrom; said hitch assembly comprising:
a hitch frame;
a hitch drawbar connected to said frame and having a vertically disposed pin receiving hole therein;
a vertically extensible power means connected to said frame above said pin receiving hole, said power means having an extensible member movable upon actuation of said power means from an elevated position to a lowered position;
a locking pin operatively connected to said extensible member in registered alignment with said pin receiving hole whereby said pin slides into said pin receiving hole whenever said extensible member moves to said lowered position and said pin moves into upward spaced relation above said pin receiving hole whenever said extensible member moves to said elevated position; and
overrun limiting means carried by said hitch frame for engaging said tractor draw bar to limit upward movement of said hitch frame with respect to said tractor draw bar;
overrun limiting means carried by said frame for engaging the undersurface of said tractor draw bar to limit upward movement of said frame with respect to said tractor drawbar;
said overrun limiting means comprising a slide member movably mounted to said frame for vertical movement therewith, spring means between said frame and said slide member for yieldably holding said frame in a predetermined position with respect to said slide member, said frame being yieldably movable upward from said predetermined position against the bias of said spring.

9. A hitch assembly according to claim 8 wherein said slide member comprises a horizontal flange engaging said under surface of said tractor draw bar.

10. A hitch assembly for a tractor having power lift, including a pair of spaced apart lift arms, said tractor further having a tractor draw bar thereon with at least one vertically extending pin receiving hole therein; said hitch assembly to be used for aligning the pin holes of a clevis of a pulled vehicle with said pin receiving hole of said tractor draw bar; said hitch assembly comprising:
a hitch frame;
a vertically extensible power means connected to said hitch frame and including an extensible member which is vertically movable in response to actuation of said power means from an elevated position to a lowered position;
a locking pin operatively connected to said extensible member and movable therewith between said elevated and said lowered positions;
mounting means on said hitch frame for operatively securing said hitch frame to said tractor draw bar in a predetermined position wherein said locking pin is in vertical registered alignment with said pin receiving hole and wherein said pin slides into said pin receiving hole when said power means is in said lowered position and moves out of and above said pin receiving hole when said power means is in said elevated position;
tongue grasping means for retentively engaging tongue of said pulled vehicle;
linkage mechanism pivotally interconnecting said tongue grasping means and said hitch frame for permitting said tongue grasping means to move between upper and lower positions;
coupling means for coupling one of said linkage mechanism and said tongue grasping means to said lift arms of said tractor whereby said lift arms may cause raising and lowering of said grasping means;
lug means adapted to be fixed to said tongue, said grasping means being elongated and shaped to let said lug mean slide longitudinally horizontally therein while at the same time preventing said lug means from dropping downwardly out of retentive engagement therein.

11. A hitch assembly according to claim 10 wherein said grasping means comprises a pair of spaced apart approximately horizontal channel members, each of which includes an inwardly turned flange adjacent its lower edge, said inwardly turned flanges extending toward one another and terminating in spaced relation, said lug means comprising a head and a stem, said head having a width greater than the distance between said flanges and less than the distance between said channel members, said stem having a thickness less than said space between said flanges.

12. A hitch assembly according to claim 11 wherein said channel members are pivotally mounted to said hitch frame for pivotal movement from a normal position, wherein said flanges are spaced apart a distance less than said width of said lug head to an expanded position wherein said flanges are spaced apart a distance greater than said width of said lug head, spring means yieldably holding said channel members in said normal position.

13. A hitch assembly according to claim 10 comprising guide means attachable to said tractor drawbar for engaging and guiding said clevis into a position whereby said pin hole of said clevis is in registered alignment with said pin receiving hole of said tractor draw bar.

* * * * *